(12) United States Patent
Skinner

(10) Patent No.: US 8,797,004 B2
(45) Date of Patent: Aug. 5, 2014

(54) POWER FACTOR CORRECTION DEVICE

(75) Inventor: Andrew John Skinner, Woolacombe (GB)

(73) Assignee: TDK-Lambda UK Limited, Devon (GB)

(*) Notice: Subject to any disclaimer, the term of this patent is extended or adjusted under 35 U.S.C. 154(b) by 271 days.

(21) Appl. No.: 13/343,791

(22) Filed: Jan. 5, 2012

(65) Prior Publication Data

US 2012/0176101 A1  Jul. 12, 2012

(30) Foreign Application Priority Data

Jan. 7, 2011  (GB) .................................. 1100219.3

(51) Int. Cl.
*G05F 5/00*  (2006.01)

(52) U.S. Cl.
USPC ................................ 323/207; 363/89; 363/90

(58) Field of Classification Search
USPC ................. 323/205, 207, 222; 363/84, 89, 90
See application file for complete search history.

(56) References Cited

U.S. PATENT DOCUMENTS

| | | | |
|---|---|---|---|
| 6,084,790 A | 7/2000 | Wong | |
| 6,088,242 A | 7/2000 | Koegel et al. | |
| 6,091,233 A | 7/2000 | Hwang et al. | |
| 6,118,673 A | 9/2000 | Hua | |
| 6,239,584 B1 | 5/2001 | Jang et al. | |
| 6,897,641 B1 | 5/2005 | Herbert | |
| 7,280,374 B1 | 10/2007 | Huang | |
| 7,295,452 B1 | 11/2007 | Liu | |
| 7,602,156 B2 | 10/2009 | Weng et al. | |
| 8,525,502 B2 | 9/2013 | Weinstein et al. | |
| 2003/0161167 A1 | 8/2003 | Barnett et al. | |
| 2005/0036337 A1 | 2/2005 | Zhang et al. | |
| 2006/0245219 A1* | 11/2006 | Li | 363/89 |
| 2007/0103947 A1* | 5/2007 | Taguchi et al. | 363/45 |
| 2007/0262758 A1 | 11/2007 | Wildash | |

(Continued)

FOREIGN PATENT DOCUMENTS

| | | |
|---|---|---|
| CN | 101325367 A | 12/2008 |
| DE | 4407709 A1 | 9/1995 |

(Continued)

OTHER PUBLICATIONS

"Boost Converter," Wikipedia, Jan. 9, 2007, http://en.wikipedia.org/wiki/Boost_converter, 8 pages.

(Continued)

*Primary Examiner* — Nguyen Tran
(74) *Attorney, Agent, or Firm* — The Webb Law Firm

(57) ABSTRACT

Disclosed is a PFC (power factor correction) device for shaping an input current of a power converter. The device includes means for receiving a rectified input voltage derived from an AC input voltage; load determining means for determining a load value L which represents the power drawn by a load supplied by the power converter; current shaping means for shaping the input current of the power converter to follow a reference waveform; and control means for controlling the current shaping means to operate over a conduction interval α during each positive and negative half cycle of the AC input voltage. The duration of the conduction interval is controlled in accordance with the load value L. The current shaping means may shape the input current to follow the reference waveform which crosses zero at phase angles which substantially correspond to the start and end of the conduction interval.

19 Claims, 10 Drawing Sheets

(56) References Cited

U.S. PATENT DOCUMENTS

| | | |
|---|---|---|
| 2007/0279955 A1 | 12/2007 | Liu et al. |
| 2009/0016087 A1* | 1/2009 | Shimizu .......................... 363/89 |
| 2010/0315849 A1* | 12/2010 | Ingemi et al. .................. 363/89 |

FOREIGN PATENT DOCUMENTS

| | | |
|---|---|---|
| JP | 5211722 A | 8/1993 |
| JP | 8331852 A | 12/1996 |
| JP | 9117146 A | 5/1997 |
| JP | 2007104857 A | 4/2007 |
| WO | 0033153 A1 | 6/2000 |
| WO | 2006137744 A1 | 12/2006 |
| WO | 2010082172 A1 | 7/2010 |

OTHER PUBLICATIONS

Grote et al, "Semi-Digital Interleaved PFC Control with Optimized Light Load Efficiency," IEEE, 2009, pp. 1722-1727.

O'Loughlin, "Advantages of interleaved boost converters for PFC," EDN, Mar. 30, 2006, pp. 75-78.

O'Loughlin, "UCC 28070 300-W Interleaved PFC Pre-Regulator Design Review," Texas Instruments, Jul. 2010, pp. 1-26.

Pinheiro et al, "Control Strategy of an Interleaved Boost Power Factor Correction Converter," IEEE, 1999, 6 pages.

Skanda et al, "Interleaved Power Factor Correction (IPFC) Using the dsPIC® DSC," Microchip Technology Inc., 2009, pp. 1-46.

Torrico-Bascope et al, "A Single Phase PFC 3kW Converter Using a Three-State Switching Cell," IEEE, 2004, pp. 4037-4042.

Wei et al, "Applying Transformer Concept to Non-isolated Voltage Regulators Significantly Improves the Efficiency and Transient Response," IEEE, 2003, pp. 235-241, vol. 4.

Yao, et al, "A Family of Buck-Type DC-DC Converters with Autotransformers," IEEE, 2003, pp. 222-228.

Ye, "Single Phase Two-Channel Interleaved PFC Converter Using MC56F8006," Freescale Semiconductor, Inc., 2009, pp. 1-26.

"Electromagnetic campatibility (EMC)—Part 3-2: Limits—Limits for harmonic current emissions (equipment input current≤16 A per phase)", BS EN 61000-3-2:2006+A2:2009, May 31, 2006, published by BSi—British Standards Institution, London, UK.

* cited by examiner

POWER FACTOR CORRECTION DEVICE

BACKGROUND OF THE INVENTION

1. Field of the Invention

The present invention relates to a power factor correction (PFC) device, and to power converter which incorporates a PFC device.

2. Description of Related Art

The requirement for loads connected to the AC mains to draw power with low harmonic distortion has existed for many years. In Europe, EN61000-3-2 is the relevant standard for single phase power supplies. EN61000-3-2 sets different limits, depending on the end equipment.

For industrial applications, EN61000-3-2 defines limits in terms of absolute levels of harmonic content. In practice, power supplies which operate at up to 100 W, with a power factor of around 0.6, comply with these absolute limits without a need for additional power factor correction. However, at higher power levels, a higher power factor, close to unity, is required.

For lighting and computer equipment, EN61000-3-2 defines more stringent harmonic current limits, such that a power factor close to unity is required at lower power levels than for industrial applications.

A common power factor correction technique, aimed at achieving compliance with EN61000-3-2, involves shaping the input current to be nearly sinusoidal. For lower loads, some level of cross-over distortion in the input current waveform can be tolerated whilst still meeting the legislative requirements. Thus, PFC circuits which create other input waveforms and achieve compliance with EN61000-3-2 are also known. However, square wave or quasi-square wave waveforms with steep edges are generally avoided, since these tend to have high harmonic content, and can also result in increased levels of audible noise.

Previous attempts to achieve compliance with harmonic content legislation have achieved success at the expense of reduced efficiency, due, for example, to increased switching losses.

U.S. Pat. No. 7,295,452 discloses a boundary-conduction-mode (BCM) PFC circuit which uses phase control. The circuit operates at a switching frequency which is approximately inversely proportional to the instantaneous input current. To avoid excessively high frequencies around the mains zero crossings, operation is started and stopped symmetrically around the peak of the mains, which results in a sinusoidal input current, with part of the waveform near the zero crossings missing (ie zero current), and steep rising and falling edges where the converter is started and stopped. These steep edges result in undesirable higher order harmonics.

SUMMARY OF THE INVENTION

According to a first aspect of the present invention there is provided a PFC (power factor correction) device (circuit) for shaping an input current of a power converter, the PFC device comprising:— means for receiving a rectified input voltage Vrec derived from an AC (alternating current) input voltage VAC;

load determining means for determining a load value L which represents the power drawn by a load supplied by the power converter;

current shaping means for shaping the input current of the power converter to follow a reference waveform Iref; and control means for controlling the current shaping means to operate over a conduction interval $\alpha$ during each positive and negative half cycle of the AC input voltage;

wherein the duration of the conduction interval $\alpha$ is controlled in accordance with the load value L.

According to a second aspect of the invention, there is provided a power converter circuit comprising:— input terminals for receiving an alternating current (AC) input voltage VAC and output terminals for supplying power to a load;

load determining means for determining a load value L representative of the power drawn by the load;

a rectifying circuit for rectifying the AC input voltage VAC to provide a rectified input voltage Vrec;

an inductive device;

switching means for controllably coupling the inductive device to the rectifying circuit such that the rectified input voltage Vrec is applied across the inductive device;

conduction interval control means for enabling coupling of the inductive device to the rectifying circuit during a conduction interval $\alpha$ within each positive and negative half cycle of the AC input voltage, wherein the length of the conduction interval $\alpha$ is controlled in accordance with the load value L; and current shaping control means for controlling the switching means during the conduction interval $\alpha$, to repeatedly couple the inductive device to the rectifying circuit and thereby shape the waveform of the current flowing into the inductive device to follow a reference waveform Iref.

It will be appreciated that outside the conduction interval $\alpha$, the inductive device is disconnected from the rectifying circuit.

By controlling the conduction interval (ie the conduction angle) $\alpha$ in accordance with the load, it is possible to improve efficiency.

In this respect, a shorter conduction angle reduces the number of switching events in each half cycle of the AC voltage input, and thus results in lower average switching losses. However, a shorter conduction angle also results in higher rms current, and thus increased conduction losses.

At lower loads, switching losses dominate over conduction losses. Thus, at lower loads, the conduction interval can be set at the minimum necessary to meet the relevant harmonic current legislation, in order to reduce switching losses, and thereby improve the overall efficiency.

At higher loads, conduction losses increase and typically dominate over switching losses. Thus, at higher loads, a longer conduction interval is required in order to reduce conduction losses, and thereby improve the overall efficiency. In order to meet harmonic limits at these higher loads, it is necessary to increase the conduction interval. Thus, the harmonic limits set the minimum conduction interval. However, for maximum efficiency, the conduction interval $\alpha$ may exceed the duration necessary to achieve compliance with harmonic content requirements.

It has been found that, with the present invention, particular improvements in efficiency are achieved at lower loads. For power supplies rated at up to 300 W, some improvement in efficiency over the whole load range is possible, because it is not necessary to operate with a conduction interval $\alpha$ equal to 180 degrees in order to meet harmonic content requirements.

As an example, considering equipment which needs to comply with EN61000-3-2 class A, the higher frequency limits (15th-39th harmonic) are 2.25A/n where n is the harmonic number. If the input current tends towards a square wave, as will be the case with a phase cutting design with, say, 90 degrees conduction per half cycle, there will be harmonic currents that reduce at a rate tending towards 1/n (that of a square wave), limiting the fundamental to around 2.25A. A waveform that does not have high high-frequency harmonics can be used at higher fundamental currents. For example, in the case of harmonics rolling off at 1/n initially, then the $3^{rd}$ harmonic limit can be met with a fundamental of 6.9A rms, or the $5^{th}$ harmonic limit can be met with a fundamental of 5.7A rms, provided the higher frequency harmonics roll-off at a faster rate. With the present invention, the relevant limits are typically the $3^{rd}$ and $5^{th}$ harmonics, with higher order harmonics below the required levels.

For a given load value, the conduction interval is preferably substantially equivalent to the higher of:—
  a) a minimum conduction interval to comply with harmonic current requirements and
  b) a conduction interval calculated to substantially maximise efficiency.

The conduction interval α preferably increases with load over at least up to a maximum value. Preferably, above said maximum value, the conduction angle α is fixed. The conduction interval α preferably increases with load above a minimum value. Preferably, below said minimum value, the conduction angle α is fixed. The conduction interval preferably increases substantially exponentially with load.

The device/circuit is preferably configured such that the duration of the conduction interval α is at least as long as required to ensure that harmonic content in the input signal does not exceed a predetermined limit.

Thus, the load dependent conduction angle employed by the present invention gives rise to a system which can be configured to meet the relevant legislative requirements, whilst achieving improved efficiency.

Preferably the control means is configured to operate the current shaping means over a conduction interval α, wherein:—
  below a lower threshold load value, the conduction interval α is substantially equal to a minimum conduction interval αmin;
  between said lower threshold load value and a higher threshold load value, the conduction interval is higher than said minimum conduction interval αmin, and increases with increasing load; and
  above the higher threshold load value the conduction interval is fixed at a maximum conduction interval αmax.

The minimum conduction angle αmin is preferably 50 to 70 degrees, more preferably substantially 60 degrees.

The lower threshold load value is preferably 50 to 100 W, more preferably substantially 75 W.

The higher threshold load value is preferably determined based on the power level of the equipment and its harmonic requirements. For instance, a 400 W PFC device designed to comply with EN61000-3-2 does not require a conduction angle greater than 90 degrees to comply with the harmonic requirements. However, a maximum conduction angle in the range 120-150 degrees is desirable to increase efficiency.

The maximum conduction angle is preferably 150 to 170 degrees, more preferably substantially 160 degrees, provided this complies with harmonic requirements. This is because, power drawn from the mains around the zero crossings is low.

It will be appreciated that the actual load threshold values and maximum and minimum conduction intervals will depend on the properties of the system, the end application and the AC input voltage.

It will be appreciated that the load value referred to herein may be an instantaneous load value, averaged over a number of mains cycles.

The conduction interval is preferably substantially symmetrical about the peak rectified input voltage Vpeak. The centre of the conduction interval may lag slightly behind Vpeak. For example, a lag in the range of 0-10 degrees, typically substantially 4 degrees.

A slightly lagging waveform is preferred for two reasons. Firstly, it offsets the leading current, typically found in the input EMC filter associated with the PFC device. Secondly, it allows the PFC to discharge the output capacitance associated with the bridge rectifier, which allows this voltage to be directly sensed to determine the point in the AC voltage where conduction should start and stop. This is possible because the starting voltage is greater than the stopping voltage, which can only occur if the AC supply has gone through the zero crossing and is increasing in magnitude.

It will be appreciated that since the conduction angle falls within a positive or negative half cycle of the AC voltage input, the conduction angle is less than 180 degrees.

In a preferred embodiment, the device/circuit further comprises determining means for determining a reference offset voltage in accordance with the load value, and the control means is configured to control the current shaping means to operate whilst the rectified voltage input is higher than a value substantially equal to said reference offset voltage.

That is to say, the conduction interval control means is configured to enable connection of the inductive device to the rectifying circuit whilst the rectified voltage input is higher than a value substantially equal to said reference offset voltage, and the current shaping control means is configured to shape the waveform of the current flowing into the inductive device whilst the rectified voltage input is higher than a value substantially equal to said reference offset voltage.

Thus, the length of the conduction interval α is varied by varying the reference offset voltage Voff.

The value of Vrec at which the current shaping means is enabled and disabled may be slightly higher or lower than Voff, due to hysteresis in the system. This is required to reject noise, as would be appreciated by a person skilled in the art.

The reference offset voltage Voff is preferably determined according to:—

$$Voff = K.Vpeak \quad (1)$$

where Vpeak is the peak value of the rectified voltage input, where K is dependent on, at least, the load value L.

The value of K in formula (1) is limited to be in the range Kmin<K<Kmax, where Kmin>0 and Kmax<1.

Thus, the reference offset voltage always falls within the voltage range of the rectified voltage input.

The value of K in formula (1) preferably also depends on the relevant harmonic current legislation.

The value of K is preferably predetermined on and end-application basis. According to formula (1), Kmax sets the minimum conduction angle and Kmin sets the maximum conduction angle. The control law in which the conduction angle moves between these two values preferably follows an approximately exponential function, optimized for the end-application. The exponential function gives a fast initial rate-of-change in conduction angle at low load, and a reduced rate-of-change at higher loads. Other functions could also be used.

It will be appreciated that the device of the invention is configured for operation in continuous conduction mode (CCM), in which the input current is forced to follow a reference waveform.

Preferably, the device further comprises waveform generating means for generating the reference waveform Iref.

Preferably the current shaping means is configured to shape the input current of the power converter to follow a reference waveform Iref which crosses zero at phase angles which substantially correspond to the start and end of the conduction interval α.

This reduces harmonic content and audible noise.

Further, the current shaping means is preferably configured to shape the input current of the power converter to follow a reference waveform Iref which has a substantially (positive) sinusoidal form over the conduction interval of the current shaping module.

This also reduces harmonic content and audible noise.

The reference waveform Iref is preferably determined to be proportional to the difference between the rectified input voltage Vrec and a reference offset voltage Voff.

Preferably the reference offset voltage is substantially equal to the rectified input voltage Vrec at the start and/or the end of the conduction interval α.

Accordingly, the reference waveform has a positive sinusoidal form over the conduction interval of the current shaping module, which crosses zero at phase angles which substantially correspond to the start and end of the conduction interval α. Thus, steep leading and trailing edges are avoided, which reduces harmonic current content in the shaped input current, and also reduces audible noise. This means that harmonic content legislation can be satisfied with a shorter conduction angle than would otherwise be the case, which results in improved efficiency, particularly at lower load levels.

More specifically, the reference waveform Vref is preferably determined according to:—

$$Iref = D.G.(Vrec - Voff) \quad (2)$$

where D is a multiplier greater than or equal to 1.

Preferably, D=Vrecpeak/(Vrecpeak−Voff), where Vrecpeak is the peak value of the rectified AC, and G is a variable transconductance term, which is determined by the controller to maintain the output voltage of the PFC device at the desired level.

Multiplier D in formula (2) serves to gain correct the waveform represented by Vrec-Voff, to compensate for the fact that its peak amplitude is reduced compared to the rectified voltage input.

In an alternative embodiment, the reference wave form is created from a look-up table phase locked to the AC input voltage.

According to another aspect of the present invention there is provided a PFC (power factor correction) device for shaping an input current of a power converter, the PFC device comprising:—
means for receiving a rectified input voltage Vrec derived from an AC (alternating current) input voltage VAC;
load determining means for determining a load value L which represents the power drawn by a load supplied by the power converter;
determining means for determining a reference offset voltage in accordance with the load value;
current shaping means for shaping the input current of the power converter to follow a reference waveform Iref; and
control means for controlling the current shaping means to operate whilst the rectified voltage input is higher than a value substantially equal to said reference offset voltage.

According to another aspect of the present invention there is provided a PFC (power factor correction) device for shaping an input current of a power converter, the PFC device comprising:—
a receiving module configured to receive a rectified input voltage Vrec derived from an AC (alternating current) input voltage VAC;
a load determining module configured to determine a load value L which represents the power drawn by a load supplied by the power converter;
a current shaping module configured to shape the input current of the power converter to follow a reference waveform Iref; and
a control module configured to control the current shaping module to operate over a conduction interval α during each positive and negative half cycle of the AC input voltage;
wherein the duration of the conduction interval α is controlled in accordance with the load value L.

Preferably, the device further comprises a load determining module configured to determine a load value L which represents the power drawn by a load supplied by the power converter. In this case the control module is preferably configured to control the current shaping module to operate whilst the rectified voltage input is higher than a value substantially equal to said reference offset voltage.

Preferably, the device further comprises a waveform generating module for generating the reference waveform Iref.

According to another aspect of the present invention there is provided a power converter comprising a power factor correction device, as defined in the claims.

According to another aspect of the present invention there is provided a power converter comprising a PFC (power factor correction) device for shaping an input current of a power converter, the PFC device comprising:—
rectifying means for receiving an AC (alternating current) input voltage VAC and providing a rectified input voltage Vrec;
load determining means for determining a load value L which represents the power drawn by a load supplied by the power converter;
current shaping means for shaping the input current of the power converter to follow a reference waveform Iref; and
control means for controlling the current shaping means to operate over a conduction interval α during each positive and negative half cycle of the AC input voltage;
wherein the duration of the conduction interval α is controlled in accordance with the load value L.

According to another aspect of the present invention there is provided a power converter comprising a PFC (power factor correction) device for shaping an input current of a power converter, the PFC device comprising:—
rectifying mean for receiving an AC (alternating current) input voltage VAC and providing a rectified input voltage Vrec;
load determining means for determining a load value L which represents the power drawn by a load supplied by the power converter;
determining means for determining a reference offset voltage in accordance with the load value;
current shaping means for shaping the input current of the power converter to follow a reference waveform Iref; and
control means for controlling the current shaping means to operate whilst the rectified voltage input is higher than a value substantially equal to said reference offset voltage.

According to a further aspect of the present invention, there is provided a method of configuring a power supply, the method comprising:—
for a plurality of load values:—
determining a minimum conduction interval to comply with harmonic current requirements;

determining a conduction interval which substantially maximises efficiency; and selecting the higher of said determined conduction intervals;

determining a function which relates conduction interval to load value, so as to substantially obtain said selected conduction intervals for the respective load values; and configuring the power supply to control conduction interval/phase angle substantially according to said function.

Preferably, the function is an exponential function. It will be appreciated the conduction interval may be determined in terms of the turn-on phase angle. The selected conduction interval/phase angle may be used to determine the value of the variable K as used in equation (1), in which case the function may relate conduction interval to load value in terms of K, and the conduction interval is preferably varied by varying the reference offset voltage Voff.

The optional and preferred features defined in the description and the claims apply to all aspects of the invention.

In particular, any or all aspects of the invention may comprise input terminals for receiving an alternating current (AC) input voltage VAC and output terminals for supplying power to a load. Any or all aspects of the invention may comprise a rectifying circuit for rectifying the AC input voltage VAC to provide a rectified input voltage Vrec. Any or all aspects of the invention may comprise an inductive device. In any or all aspects of the invention, the current shaping means/module may comprise switching means/a switching module for controllably coupling the inductive device to the rectifying circuit such that the rectified input voltage Vrec is applied across the inductive device and current shaping control means for controlling the switching means during the conduction interval α to repeatedly couple the inductive device to the rectifying circuit and thereby shape the waveform of the current flowing into the inductive device to follow a reference waveform Iref. Any or all aspects of the invention may comprise conduction interval control means for enabling coupling of the inductive device to the rectifying circuit during the conduction interval α.

BRIEF DESCRIPTION OF THE DRAWINGS

The present invention will now be described with reference to the accompanying drawings in which:—

DETAILED DESCRIPTION OF THE INVENTION

Figure 1:
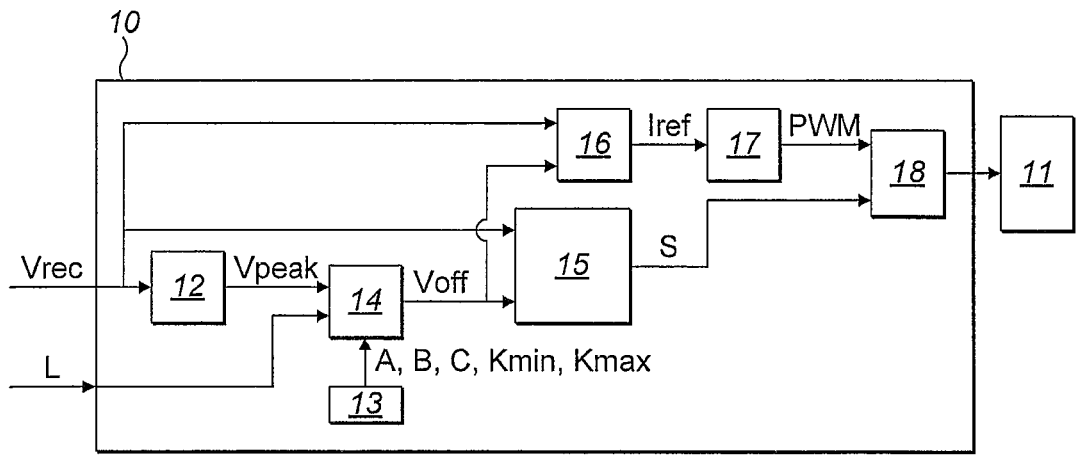
FIG. 1 shows a simplified schematic representation of a PFC circuit which embodies the present invention.

FIG. 1 shows a PFC circuit which embodies the present invention. The circuit comprises a control module 10 and a current shaping module (switching circuit) 11.

Switching circuits which shape an input current to follow the waveform of a reference signal are well known in the art. For example, a boost pre-regulator such as that described in Texas Instruments application note SLUA269. Accordingly, the components and functionality of the current shaping module 11 are not described in detail here.

A rectified voltage input Vrec is provided as an input to the control module, together with a load signal L, which represents the instantaneous current or power drawn by a load associated with the circuit.

Vrec is provided as input to a first determining module 12 of the control module. The first determining module determines the peak value of Vrec, Vpeak.

The control module comprises a storage module 13. Storage module 13 stores a look-up table which comprises values for variables A, B, C, Kmin and Kmax which depend on the AC line voltage and permitted harmonic content levels according to the end application and the relevant legislation.

L and Vpeak are provided as inputs to a second determining module 14 of the control module, and suitable values for A, B, C, Kmin and Kmax are read out from the storage module 13.

The second determining module then calculates a reference offset voltage Voff according to:

$$Voff = K \cdot Vpeak \quad (1)$$

where $$K = Fn(L=, A, B, C, Kmin, Kmax) \quad (3)$$

and where L= is a low pass filtered version of the load L which represents the average load over a number of mains cycles.

To determine suitable values for K, it is first necessary to calculate theoretical values for K for different load values, in order to meet harmonic requirements and to maximise efficiency. These values are then curve fit to an exponential function from which a value of K can be derived for any given value of L=.

The process of calculating theoretical values for K is as follows:— a) identify a plurality of load values, for example as a percentage of the full load value.

b) using the relevant harmonic standard, calculate the turn-on phase angle limit, ie, the greatest angle at which the conduction interval can start, for each of the identified load values. This is substantially equivalent to identifying the shortest conduction interval which meets the harmonic standard, since the conduction interval is substantially symmetric about Vpeak, with a known lag.

c) from analysis of the power converter characteristics, measure/calculate the optimised turn-on phase angle limit for each of the identified load values that maximises efficiency. Again, this is substantially equivalent to identifying the optimum conduction interval for maximising efficiency.

d) for each of the identified load values, select the lower of the two turn-on phase angle limits identified in steps b) and c).

e) calculate K as the sine of the required turn-on angle.

Tables 1 and 2 give exemplary figures for a 180 W product which is intended to comply with the Energy Star harmonic standard.

Table 1 sets out the Power Factor (PF) limits specified in the Energy Star standard, and the calculated maximum turn-on phase angle for different load values. Where the standard does not impose a PF limit, it is theoretically possible to have a turn-on angle of 90 degrees. In practice, however, the turn-on angle will always be lower than 90 degrees to ensure that a reliable current pulse can be generated.

Table 2 shows the maximum turn-on phase angle for Energy Star compliance in the column AEnergy Star Limit@; the optimum turn-on phase angle for maximum efficiency in the column AEfficiency Limit@; the lower of these two limits, which is selected as the turn-on phase angle in the column ATurn-on Angle@; and the value of K calculated from the selected turn-on phase angle in the column AK@.

Once theoretical values of K are calculated, these are curve fit the exponential function:—

$$K = Kmin + (Kmax - Kmin) * (\exp(-X/\text{constant})) \quad (6)$$

where X=load−offset1 and offset1 is the first load level.

More specifically,

```
If X>0
{
K = Kmin + (Kmax − Kmin)(1−(A*X−B*X²+C*X³))
If (K < Kmin) then K = Kmin
}
Else K = Kmax
```

This is an approximation to formula (6).

Kmax and Kmin in formula (6) are determined in accordance with the technical requirements of the power converter and/or the load.

Kmax is preferably set at approximately 0.87. In any case, Kmax is preferably less than 0.9, because values higher than 0.9 can cause a low power factor and implementation difficulties, such as small levels of hysteresis.

Kmin is preferably limited to a value in the range 0.1 to 0.25, unless otherwise required to meet harmonic requirements. This prevents current overshooting after the supply has gone through a zero crossing, which can lead to audible noise.

In the case of the 180 W PSU, the minimum value of K is 0.45, and the issue of current overshooting around the zero crossing does not occur.

Figure 12A:
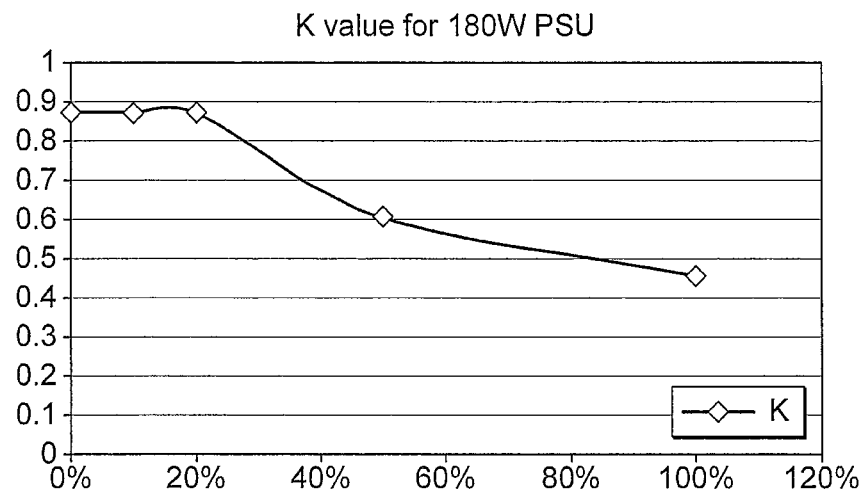
FIG. 12a is a graph of K vs load for a 180 W PSU designed to comply with the PF limits in Table 1.

FIG. 12a is a graph of K vs load for a 180 W PSU designed to comply with the PF limits in Table 1.

TABLE 1

| Power | Energy Star PF Min | Max turn-on angle |
|---|---|---|
| <75 W | n/a | n/a (90 degrees) |
| 10% load | n/a for PSU <500 W | n/a (90 degrees) |
|  | 500 W-1000 W 0.65 | >60 degrees |
| 20% load (if >75 W) | 0.8 | 52.5 degrees |
| 50% load (if >75 W) | 0.9 | 37 degrees |
| 100% load (if >75 W) | 0.95 | 27 degrees |

TABLE 2

| Load | Energy Star Limit | Efficiency Limit | Turn-on Angle | K |
|---|---|---|---|---|
| 10% | 90 | 60 | 60 | 0.87 |
| 20% | 90 | 60 | 60 | 0.87 |
| 50% | 37 | 45 | 37 | 0.6 |
| 100% | 27 | 45 | 27 | 0.45 |

Figure 12B:
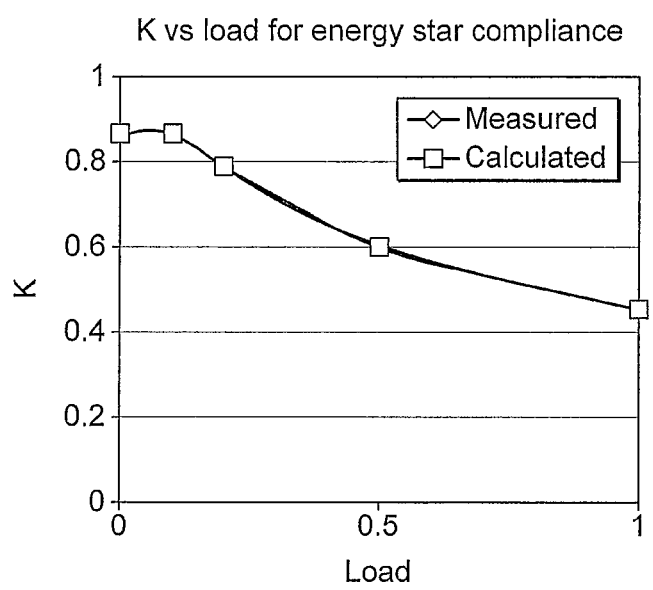
FIG. 12b is a graph of K versus load for Energy Star power factor compliance.

Table 3 gives the measured minimum values of K to comply with Energy Star (a US specification) power factor requirements. The calculated K value to fit this as Kmin=0.453, Kmax=0.87, A=2, B=1, C=0.015. For a high power design, the value of Kmin would be reduced since operation with lower values of K will result in a higher power factor (with reduced rms current) and higher efficiency. A graph of K versus Load is shown in FIG. 12b.

For maximum efficiency, K is desirably below the number indicated (wider conduction angle), the precise value being dependent on the power circuit design. The measured values are values of K vs load for a 300 W PFC device, which meets the requirements of Energy Star.

TABLE 3

| Kmin | (Kmax − Kmin) | A | B | C |
|---|---|---|---|---|
| 0.453 | 0.417 | 2 | 1 | 0.015 |

| Load | measured K | calculated K |
|---|---|---|
| 0 | 0.87 | 0.87 |
| 10% | 0.87 | 0.87 |
| 20% | 0.79 | 0.790764 |
| 50% | 0.6 | 0.60272 |
| 100% | 0.453 | 0.45261 |

Vrec and Voff are provided as inputs to a comparator module 15, which compares Vrec with Voff, to generate the on/off signal S, such that:

$$S = 1 \text{ (on) when VAC} > V\text{off} + H, \text{ and} \quad (4)$$

$$S = 0 \text{ (off) when VAC} < V\text{off} \quad (5)$$

where H represents hysteresis.

Vrec and Voff are also provided as inputs to a waveform generating module 16, which generates a reference waveform Iref according to formula (2):

$$Iref = D.G.(\text{VAC} - V\text{off}) \quad (2)$$

In formula (2), D is a demand signal which provides gain correction, to compensate for the fact that (VAC-Voff) is small compared to the peak rectified AC voltage, Vpeak.

G is a transconductance term determined by a control circuit that regulates the output of the PFC device.

In an embodiment, $$D = V\text{peak}/(V\text{peak} - V\text{off}) \quad (9)$$

This provides first order gain correction.

More complete gain correction may be provided if D also accounts for the conduction duty-cycle a/180 degrees.

The reference waveform Iref is provided as an input to a PWM module 17, which provides a pulse width modulation signal PWM, based on the reference waveform Iref.

The signals PWM and S are provided as inputs to a buffer module 18, which drives operation of the current shaping module 11 to shape the input current to follow the reference waveform Iref, over a conduction interval α where S=1.

FIGS. 2 to 5 illustrate the operation of the circuit shown in FIG. 1.

Figure 2:
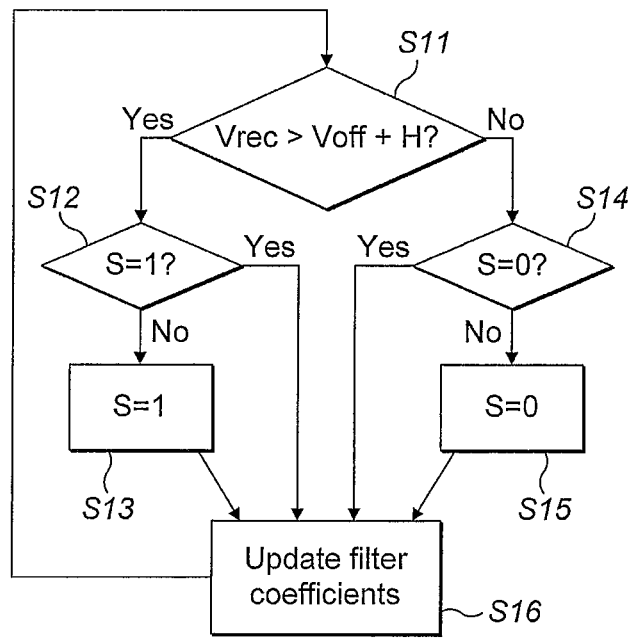
FIG. 2 is a flow diagram which illustrates the main loop process of the circuit shown in FIG. 1.

FIG. 2 illustrates the main loop process, which is typically implemented as an infinite loop.

At step S11, it is determined whether Vrec>Voff+H. If Yes, the process proceeds to step S12, where the level of signal S is determined. If S=0 (No, at step S12), the process proceeds to step S13, where the level of signal S is changed to S=1, which in turn enables operation of the current shaping module 13. The process then proceeds to step S16. If S=1 (Yes, at step S12), operation of the current correcting module is already enabled, and the process proceeds directly to step S16.

If the result at step S11 is No, the process proceeds to step S14, where the level of signal S is determined. If S=1 (No, at step S14), the process proceeds to step S15, where the level of signal S is changed to S=0, which in turn disables operation of the current shaping module 11. If S=0 (Yes, at step S14) then operation of the current shaping module is already disabled, and the process proceeds directly to step S16.

In step S16 various filter coefficients are updated, to reflect values determined in scheduled tasks associated with the main loop process, and the process returns to step S11.

Figure 12C:
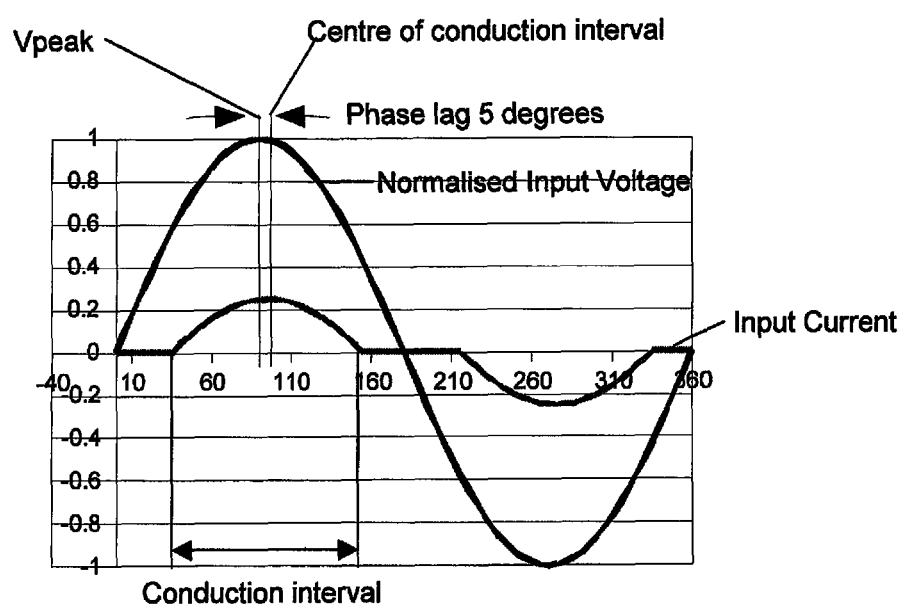
FIG. 12c is a graph of input voltage and input current.

Accordingly, operation of the current shaping module 11 is enabled once the rectified input voltage Vrec is greater than the reference offset voltage Voff. This corresponds to operation within a conduction phase angle $\alpha$, which is approximately centered around the peak mains voltage, but slightly lagging as shown in FIG. 12c. The conduction phase angle $\alpha$ can thus be varied by varying Voff.

Figure 3:
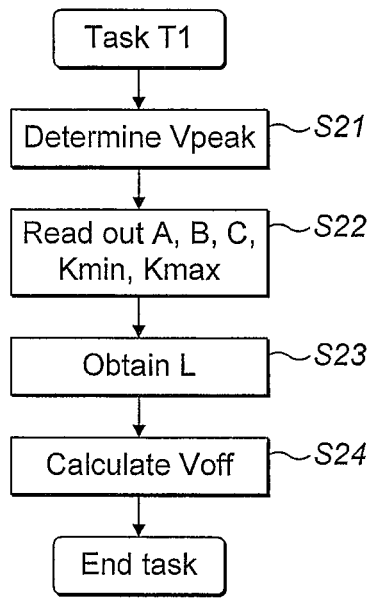
FIG. 3 is a flow diagram which illustrates a task T1 scheduled during the main loop process illustrated in FIG. 2.

FIG. 3 illustrates a task T1, in which a value for Voff is determined. Task T1 is implemented at regular intervals during operation of the main loop, by means of a task scheduler or as an interrupt service routine.

At step S21, the first determining module 15 determines the peak rectified AC voltage Vpeak. At step S22, values for A, B, C, Kmin and Kmax are read out from the look-up table stored in storage module 13. At step S23, the value of L is obtained. Steps S21-23 may be performed in any order, and any or all of these steps may be performed simultaneously. At step S24, the second determining module calculates a value for Voff according to formulas (1) and (3). After step S24, task T1 ends.

From formulas (1) and (3) it can be seen that Voff is a percentage of the peak rectified AC Vpeak, and varies according to the load L.

Accordingly, Voff, and thus the conduction phase angle $\alpha$, vary with the instantaneous load value L.

Figure 4:
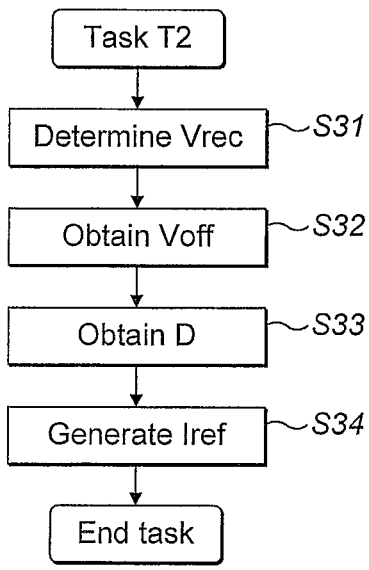
FIG. 4 is a flow diagram which illustrates a task T2 scheduled during the main loop process illustrated in FIG. 2.

FIG. 4 illustrates a task T2, which generates the reference waveform Iref. Task T2 is implemented at regular intervals during operation of the main loop, by means of a task scheduler or as an interrupt service routine.

At step S31, the rectified input voltage Vrec is obtained. At step S32, the current value of Voff is obtained. At step S33, the current value of D is obtained. Steps S31-23 may be performed in any order, and any or all of these steps may be performed simultaneously. At step S34, the third determining module calculates reference waveform Iref according to formula (3). After step S34, task T2 ends.

D is determined according to formula (9).

In relation to FIGS. 2 to 4, it will be appreciated that these flow diagrams represent a simplified version of the actual operation, for the purposes of explaining the present invention. In practice, various additional functions may be required. However, the implementation of such functions will be straightforward for a person skilled in the art to implement, and further description of these is not necessary for an understanding of the present invention.

With the above described arrangement, the conduction phase angle $\alpha$ is varied in accordance with the instantaneous load value L, in order to achieve improved efficiency. In this respect, the two major factors which affect efficiency are switching losses and conduction losses. Switching losses can be reduced by narrowing the conduction angle, to reduce the number of switching events per mains half cycle and thus reduce average switching losses. However, this approach leads to higher rms currents, which increases conduction losses.

At lower loads, switching losses dominate, such that overall efficiency can be improved by setting a narrow conduction angle.

At higher loads, conduction losses dominate, such that overall efficiency can be improved by setting a wider conduction angle.

Figure 5:
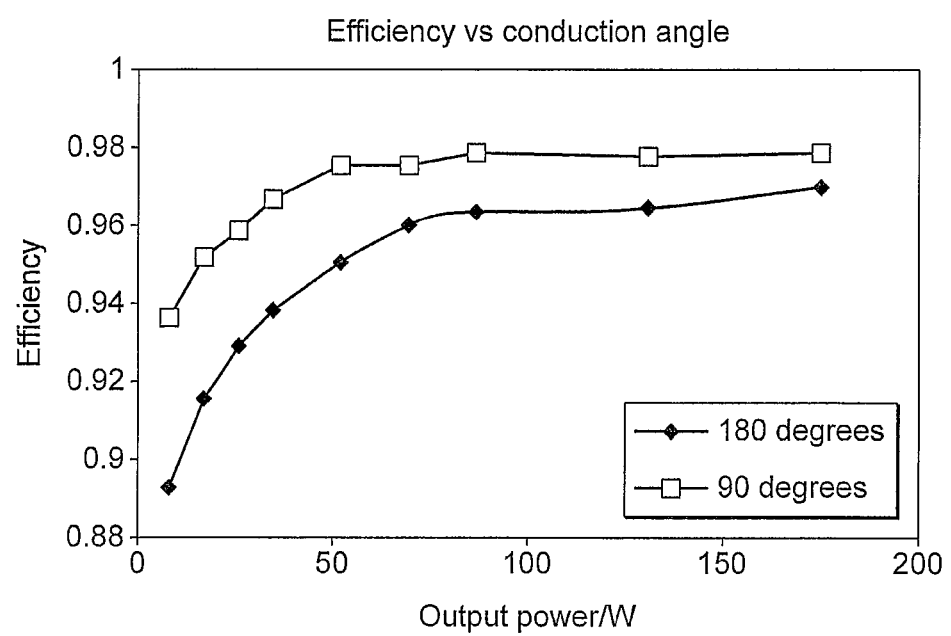
FIG. 5 shows the overall efficiency of an exemplary DSP controlled PFC circuit.

FIG. 5 shows the overall efficiency of an exemplary DSP controlled PFC circuit which operates:—
1) over the complete mains half cycle (180 degrees); and
2) over a fixed conduction angle of 90 degrees.

As can be seen from FIG. 5, at higher loads the efficiency improvement achieved with the narrower conduction angle reduces, and a wider conduction angle is preferred.

Additionally, with the above described arrangement, the reference waveform Iref is based on the same reference offset voltage Voff which is used to determine the conduction angle. Accordingly, the zero crossing points of the reference waveform substantially coincide with switch-on and switch-off of the current shaping module. This avoids steep edges in the resultant input current waveform, and thus reduces harmonic content. This means that harmonic content legislation can be satisfied with a shorter conduction angle than would otherwise be the case, which results in improved efficiency, particularly at lower load levels.

Figure 6:
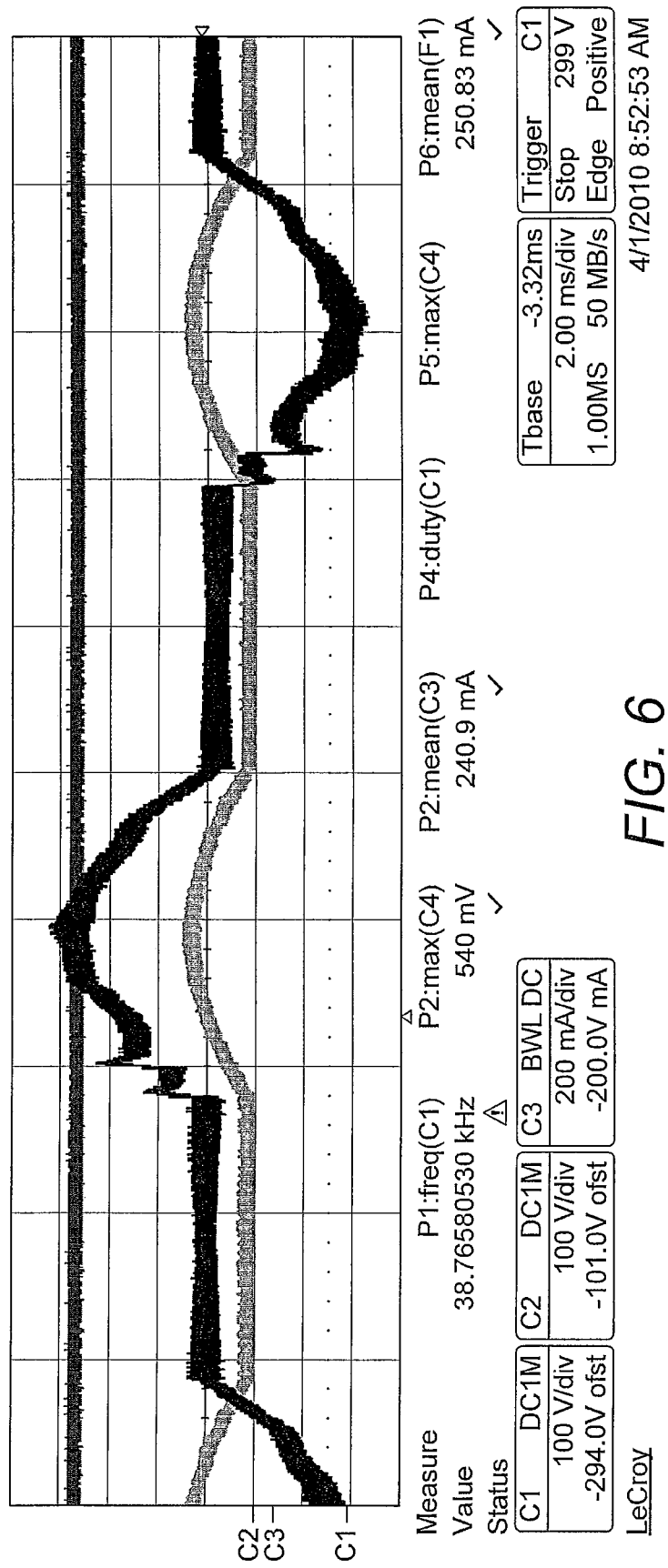
FIG. 6 shows representative waveforms generated by a DSP controlled PFC circuit.

FIG. 6 shows representative waveforms generated by a DSP controlled PFC circuit. The trace 61 shows the rectified AC voltage VAC. Trace 62 shows the shaped input current. This can be seen to approximate the rectified AC voltage VAC. Trace 63 shows the DC output voltage of the PFC circuit.

The present invention may be implemented in software, for example on a digital signal processor (DSP)/microprocessor. The present invention may also be implemented in hardware.

FIGS. 8 to 11 are flow charts which illustrate the functions of a digital signal controller programmed in accordance with the present invention.

Figure 8:
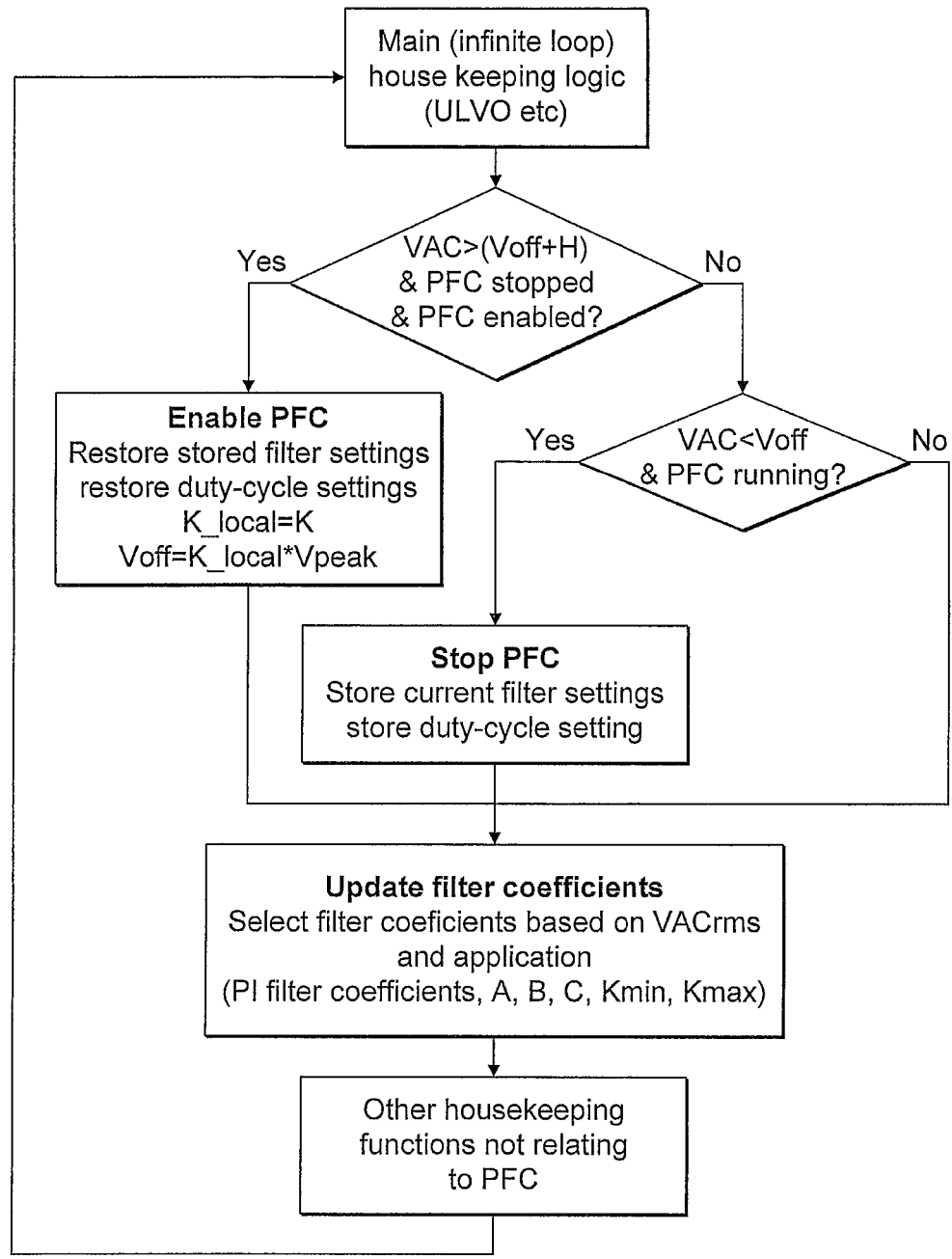
FIGS. 8 to 11 are flow charts which illustrate the functions of a digital signal controller programmed in accordance with the present invention.

FIG. 8 shows the main loop of the embedded controller, which is typically implemented as an infinite loop. The main loop relies on other tasks implemented at regular intervals by either a task scheduler or as interrupt service routines to update the information that it uses. For example, the variables K and Voff.

Figure 9:
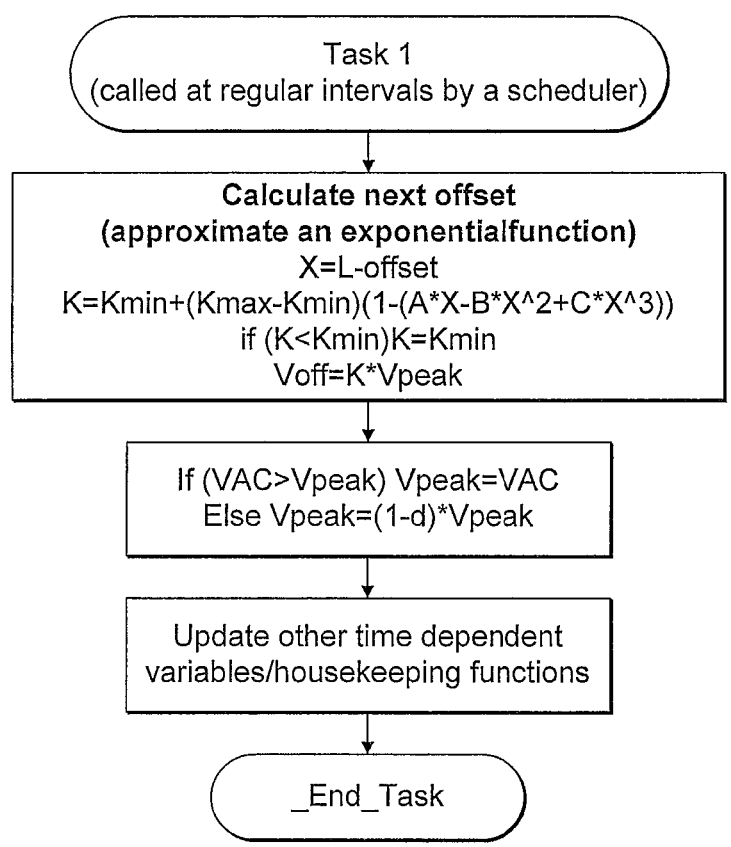

FIG. 9 shows Task 1 which is called regularly and is used to update the variables Vpeak, which is the peak value of the mains voltage.

Figure 10:
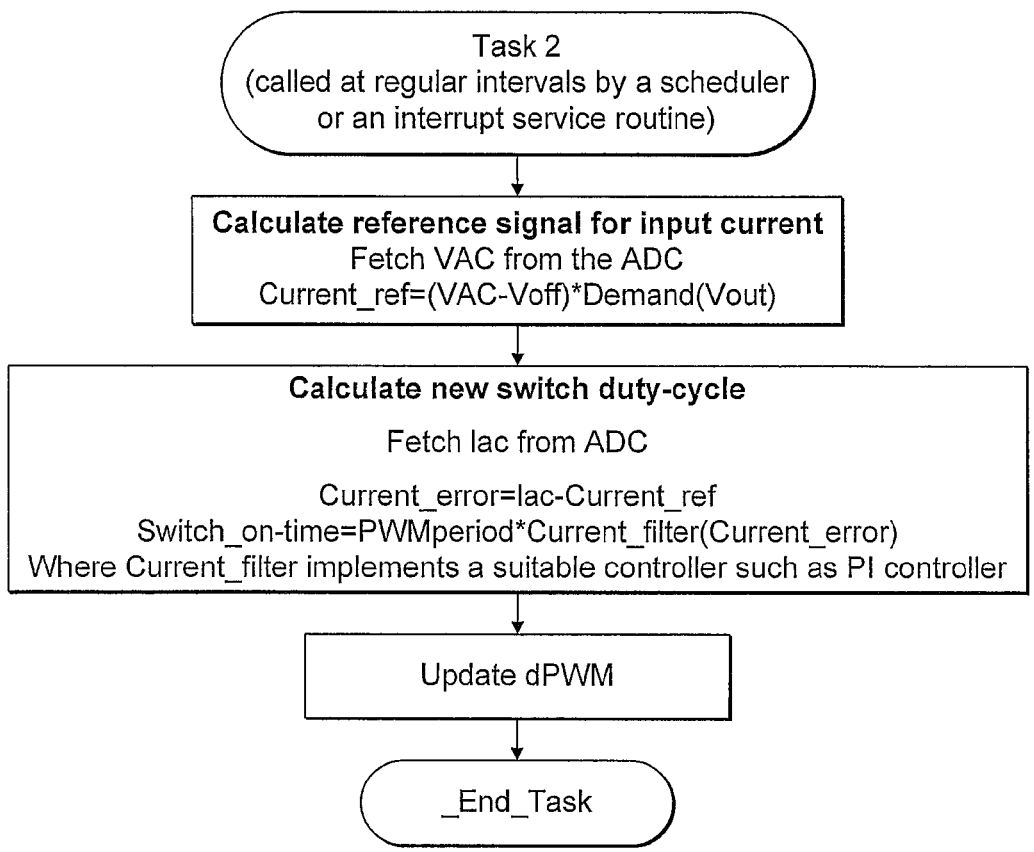
Figure 11:
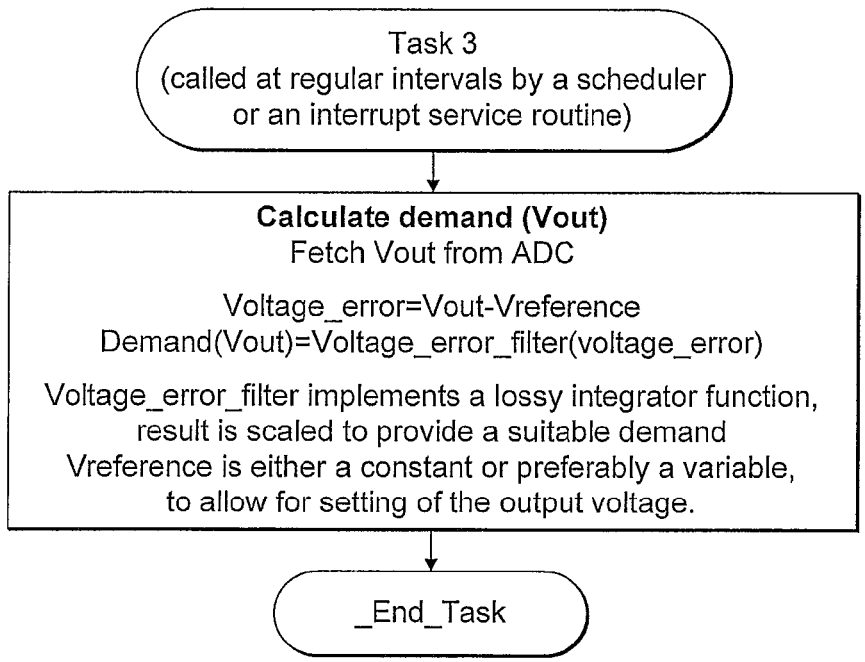

FIGS. 10 and 11 deal with the implementation of the control-loop filters for the current loop (Task 2) and the voltage control loop (Task 3). The output of Task 3 is a demand signal Demand(Vout) that is a transconductance term which, when multiplied by the voltage, yields a current reference that can be used by the current control loop. The demand signal Demand(Vout) is G in formula (2).

Figure 7:
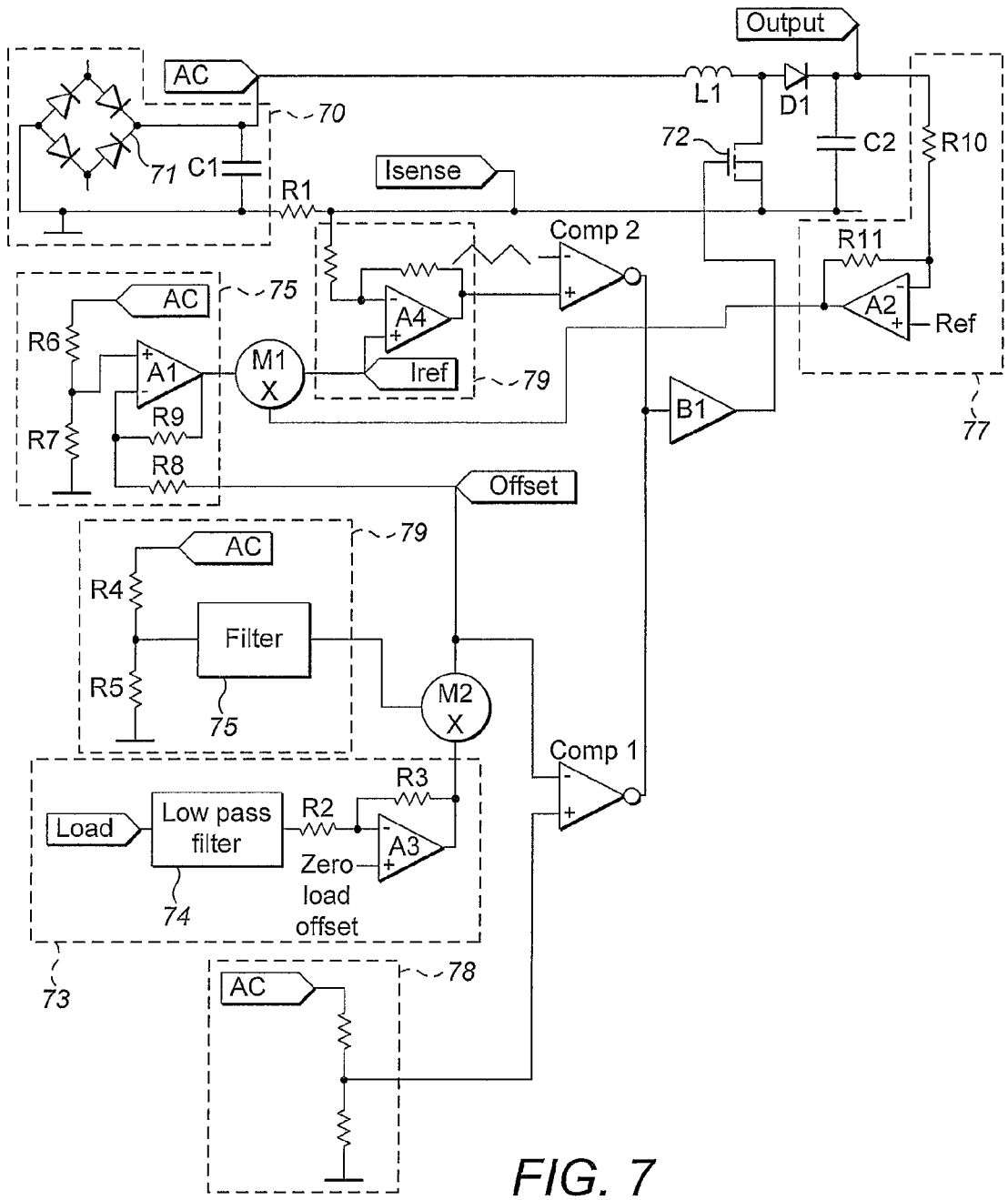
FIG. 7 shows a simplified schematic representation of a single phase boost converter which comprises a PFC circuit which embodies the present invention.

FIG. 7 shows a simplified schematic representation of a single phase boost converter which comprises a PFC circuit which embodies the present invention.

The converter comprises a rectifying circuit 70, which comprises a four diode bridge rectifier 71 and a smoothing capacitor C1. The bridge is connected at two of its nodes to an AC input voltage VAC (not shown). The smoothing capacitor C1 is connected in parallel across the other two nodes of the bridge. Lines respectively connected at each side of the smoothing capacitor C1, carry the rectified input voltage Vrec, generated by the rectifying circuit 70. This signal is identified as AC in FIG. 7.

An input inductor L1 is connected to one side of the smoothing capacitor C1. The input inductor L1 is in turn connected in series with the anode side of a diode D1.

A controllable switch 72 such as a MOSFET is connected in parallel with the smoothing capacitor C1, such that one side of the switch 72 is connected to a node located between the input inductor L1 and the diode D1.

A second capacitor C2 is connected in parallel with the smoothing capacitor C1 and the switch 72, such that one side of the switch is connected at the cathode side of the diode D1.

The output from the second capacitor represents the output voltage Vout of the converter, which supplies a load (not shown). The output voltage signal is identified as AOutput@ in FIG. 7.

In module 73, a load signal, identified as Load in FIG. 7 is supplied to a low pass filter 74, and in turn to the inverting input of an amplifier A3. A resistor R2 is connected between the low pass filter and the amplifier A3. A reference which represents a zero load offset is provided to the non-inverting input of amplifier A3. A resistor R2 is connected between the output of the amplifier A3 and its inverting input.

The load signal is preferably derived from the downstream load. However, the load signal could alternatively be derived from the average of the signal Isense.

The low pass filter in module 73 filters the input load signal to provide a signal which represents the value of the load. Amplifier A3 amplifies to this signal to provide a gain adjusted load signal.

In module 79, the rectified input voltage Vrec (AC) is divided down by series connected resistors R4, R5, and applied to a filter 75, which is connected to a node located between resistors R4 and R5.

The filter 75 filters the divided down rectified input voltage Vrec to provide a signal Vpeak which represents the peak value of the rectified input voltage.

The outputs from modules 73 and 74 are respectively coupled to a multiplier M2, which multiplies the two signals to provide a signal which represents the product of the peak rectified input voltage, and the gain adjusted load signal. This signal is the offset reference voltage Voff, which is identified as offset in FIG. 7.

In module 76, the rectified input voltage Vrec (AC) is divided down by series connected resistors R6, R7, and applied to the non-inverting input of an amplifier A1, which is connected to a node located between resistors R6 and R7.

The output of the multiplier M2 is connected to the inverting input of amplifier A1. A resistor R8 is connected between the output of multiplier M2 and the inverting input of amplifier A1. A resistor R9 is connected between the output of the amplifier A1 and its inverting input.

The output of amplifier A1 is the sum of the divided down rectified input voltage Vrec (AC) and the reference offset voltage (offset).

In module 77, one side of the second capacitor C2 is connected to the inverting input of amplifier A2. This applies the output voltage signal Vout (Output) to amplifier A2. A resistor R10 is connected between the capacitor C2 and the inverting input of amplifier A2. A resistor R11 is connected between the output of the amplifier A2 and its inverting input.

The non-inverting input of amplifier A2 is set at a reference value which represents the desired output voltage.

The output of A2 is an error signal, which is a function of the difference between the achieved, and the desired output voltage.

The outputs from modules 76 and 77 are respectively coupled to a multiplier M1, which multiplies the two signals.

M1 may take an additional input inversely proportional to the square AC voltage, as is common in continuous-conduction mode PFC circuits to eliminate variation in circuit gain with line voltage.

The output from multiplier M1 represents a reference waveform Iref.

The output of multiplier M1 is connected to the non-inverting input of an amplifier A4.

The inverting input of amplifier A4 is connected to a signal which represents the AC input current of the converter. In the example shown in FIG. 7, a sensing resistor R1 is connected between the smoothing capacitor C1 and the switch 72, and the inverting input of amplifier A4 is connected to a node located between the sensing resistor R1 and the switch 72. However, alternative current sense schemes may be used. A resistor R12 is connected between the sensing resistor R1 and the inverting input of amplifier A4. A resistor R13 is connected between the output of the amplifier A4 and its inverting input.

Amplifier A4 acts as an inner current-loop error-amplifier, the output of which sets the demand (reference waveform) for the PWM (pulse width modulation) comparator C2.

The output of amplifier A4 is connected to one input of comparator Comp2. The other input of comparator Comp2 is connected to a triangle wave generator (not shown), which generates a triangle waveform. The comparator Comp2 compares the triangle waveform with the demand signal output by amplifier A4, to provide a pulse width modulated output signal for driving operation of the switch 72.

In module 78, the rectified input voltage Vrec (AC) is divided down by series connected resistors R14, R15, and applied to one input of a comparator Comp1, which is connected to a node located between resistors R14 and R15.

The other input of comparator Comp1 is connected to the output of multiplier M2.

Comparator Comp1 compares the divided down rectified input voltage Vrec with the reference offset voltage Voff, and outputs a signal which represents whether the rectified input voltage is higher or lower than the reference offset voltage.

The outputs of comparators Comp1 and Comp2 are supplied to respective inputs of a buffer B1. The output of B1 is connected to a control input of switch 72, to control operation of the switch.

Buffer B1 drives the power stage of the circuit by applying the PWM signal output of comparator Comp2, only when the output of comparator Comp1 indicates that the rectified input voltage exceeds Voff.

Thus, power factor correction is applied over a conduction angle α, which depends on the load dependent reference offset voltage Voff.

Moreover, the reference waveform which governs pulse width modulation is a gain corrected signal which corresponds to the difference between the rectified input voltage Vrec and the same reference offset voltage Voff which determines the conduction angle. Thus, steep leading and trailing edges in the input current waveform are avoided.

In the circuit illustrated in FIG. 7, the gain applied by amplifiers A1-A4 is set so that the conduction angle α (through its dependence on Voff) is sufficient to meet the relevant legislative harmonic current requirements for the particular application.

The gain applied by any or all of these amplifiers may be fixed or variable, depending on requirements. In certain embodiments, the gain of any or all of these amplifiers may be variable to change the gain applied in accordance with supply voltage conditions.

It will be understood that the embodiments described above show applications of the invention only for the purposes of illustration. In practice, the invention may be applied to many different configurations, the detailed embodiments being straightforward for those skilled in the art to implement.

The invention claimed is:

1. A PFC (power factor correction) device for shaping an input current of a power converter, the PFC device comprising:
   a receiving module for receiving a rectified input voltage Vrec derived from an AC (alternating current) input voltage VAC;
   a load determining module for determining a load value L which represents a power drawn by a load supplied by the power converter;
   a reference determining module for determining a reference offset voltage Voff in accordance with the load value L;
   a reference waveform module for generating a reference waveform Iref, wherein the reference waveform Iref is proportional to Vrec−Voff;
   a current shaping module for shaping the input current of the power converter to follow the reference waveform Iref; and
   a control module for controlling the current shaping module to operate over a conduction interval α, in which the rectified voltage input Vrec is higher than a value substantially equal to said reference offset voltage Voff, during each positive and negative half cycle of the AC input voltage;
   wherein a duration of the conduction interval α is controlled in accordance with the load value L.

2. A power converter circuit comprising:
   input terminals for receiving an alternating current (AC) input voltage VAC and output terminals for supplying power to a load;
   a load determining module for determining a load value L representative of a power drawn by the load;
   a rectifying circuit for rectifying the AC input voltage VAC to provide a rectified input voltage Vrec;
   an inductive device;
   a switching module for controllably coupling the inductive device to the rectifying circuit such that the rectified input voltage Vrec is applied across the inductive device;
   a conduction interval control module for enabling coupling of the inductive device to the rectifying circuit during a conduction interval α within each positive and negative half cycle of the AC input voltage, wherein a length of the conduction interval α is controlled in accordance with the load value L;
   a reference determining module for determining a reference offset voltage Voff in accordance with the load value;
   a reference waveform module for generating a reference waveform Iref, wherein the reference waveform Iref is proportional to Vrec−Voff; and
   a current shaping control module for controlling the switching module during the conduction interval α, in which the rectified voltage input Vrec is higher than a value substantially equal to said reference offset voltage Voff, to repeatedly couple the inductive device to the rectifying circuit and thereby shape a waveform of the current flowing into the inductive device to follow a reference waveform Iref.

3. The PFC device as claimed in claim 1, wherein, for a given load value, the conduction interval is preferably substantially equivalent to the higher of:
   a) a minimum conduction interval to comply with harmonic current requirements and
   b) a conduction interval calculated to substantially maximize efficiency.

4. The PFC device as claimed in claim 1, wherein the conduction interval α increases with the load value L at least up to a maximum load value.

5. The PFC device as claimed in claim 4, wherein, if the load value L is above said maximum load value, the conduction angle α is fixed.

6. The PFC device as claimed in claim 4 wherein, if the load value L is below a minimum load value, the conduction angle α is fixed.

7. The PFC device as claimed in claim 1, wherein the conduction interval increases substantially exponentially with the load value L.

8. The PFC device as claimed in claim 1, wherein:
   if the load value L is below a lower threshold load value, the conduction interval α is substantially equal to a minimum conduction interval αmin;
   if the load value L is between said lower threshold load value and a higher threshold load value, the conduction interval is higher than said minimum conduction interval αmin, and increases with increasing load; and
   if the load value L is above the higher threshold load value the conduction interval is fixed at a maximum conduction interval αmax.

9. The PFC device as claimed in claim 8, wherein the minimum conduction interval αmin is preferably in the range 50 to 70 degrees.

10. The PFC device as claimed in claim 8, wherein the lower threshold load value is 50 to 100 W.

11. The PFC device as claimed in claim 1, wherein the maximum conduction interval is in the range 150 to 170 degrees.

12. The PFC device as claimed in claim 1, wherein the conduction interval is substantially symmetrical about a peak rectified input voltage Vpeak.

13. The PFC device as claimed in claim 12, wherein a centre of the conduction interval lags behind the peak rectified input voltage Vpeak, with a lag in a range of 0-10 degrees.

14. The power converter circuit as claimed in claim 2 wherein the conduction interval control module is configured to enable connection of the inductive device to the rectifying circuit whilst the rectified voltage input is higher than a value substantially equal to said reference offset voltage, and wherein the current shaping control module is configured to shape the waveform of the current flowing into the inductive device whilst the rectified voltage input is higher than a value substantially equal to said reference offset voltage.

15. The PFC device as claimed in claim 1, wherein the reference offset voltage Voff is determined according to:

$$Voff = K \cdot Vpeak \quad (1)$$

where Vpeak is a peak value of the rectified input voltage, where K is dependent on, at least, the load value L.

16. The PFC device as claimed in claim 14 wherein the value of K in formula (I) is limited to be in a range Kmin<K<Kmax, where Kmin>0 and Kmax<1.

17. The PFC device as claimed in claim 1 wherein the reference waveform Iref is determined according to:

$$Iref = D \cdot G \cdot (Vrec - Voff) \quad (2)$$

where D·G· is a multiplier greater than or equal to 1.

18. A method of configuring a power supply, the method comprising:
   for a plurality of load values:
   determining a minimum conduction interval to comply with harmonic current requirements;

determining a conduction interval which substantially maximises efficiency; and selecting a higher of said determined conduction intervals;

determining a function which relates conduction interval to load value, so as to substantially obtain said selected conduction intervals for the respective load values;

configuring the power supply to control conduction interval/phase angle substantially according to said function, wherein the determining the function comprises determining a reference offset voltage in accordance with the load value and wherein the configuring the power supply comprises configuring the power supply to control the conduction interval/phase angle in which a rectified voltage input is higher than a value substantially equal to said reference offset value.

19. The PFC device as claimed in claim 1, wherein the control module controls the current shaping module to operate over the conduction interval α in which the rectified voltage input Vrec is higher than a sum of said reference offset voltage Voff a value H, wherein H is a positive or negative value which represents hysteresis.

* * * * *

UNITED STATES PATENT AND TRADEMARK OFFICE
CERTIFICATE OF CORRECTION

PATENT NO. : 8,797,004 B2  
APPLICATION NO. : 13/343791  
DATED : August 5, 2014  
INVENTOR(S) : Andrew John Skinner It is certified that error appears in the above-identified patent and that said Letters Patent is hereby corrected as shown below:

In the Claims

Column 16, Line 55, Claim 16, delete "claim 14" and insert -- claim 15 --

Column 17, Line 11, Claim 18, delete "value" and insert -- value, --

Signed and Sealed this  
Second Day of December, 2014

Michelle K. Lee  
*Deputy Director of the United States Patent and Trademark Office*